Patented Oct. 3, 1933

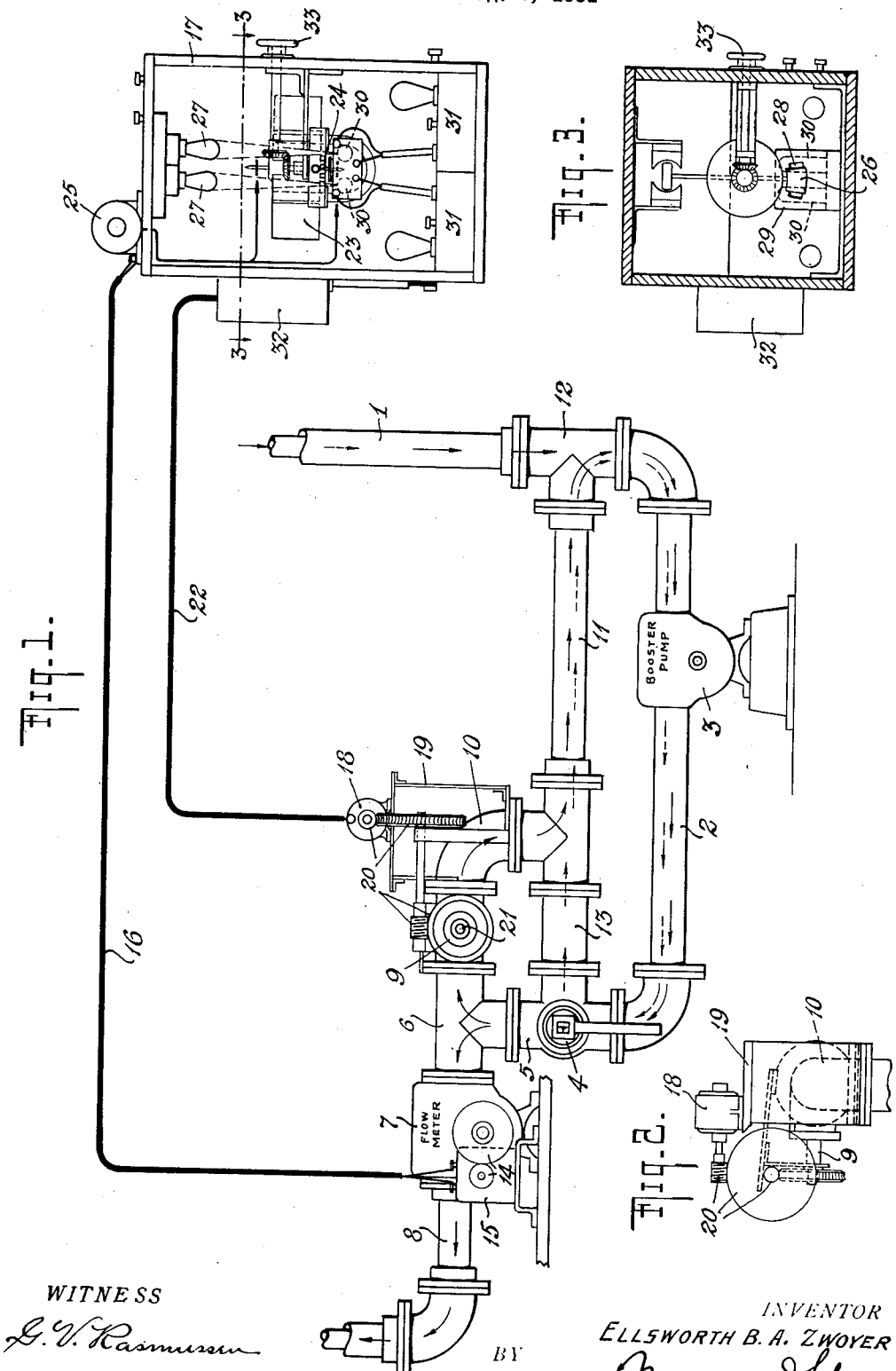

1,928,776

UNITED STATES PATENT OFFICE 1,928,776

APPARATUS FOR CONTROLLING THE FLOW RATE OF LIQUIDS

Ellsworth B. A. Zwoyer, Perth Amboy, N. J., assignor to The General Fuel Briquette Corporation, New York, N. Y., a corporation of New York Application August 8, 1931. Serial No. 556,027

9 Claims. (Cl. 103—41)

The invention relates to apparatus for supplying material of a generally liquid character to a point of utilization and for accurately controlling the rate of supply of such material, that is, the amount delivered per unit of time, to such point of utilization.

The apparatus has been designed especially for the supply of a viscous binder to be mixed with pulverized fuel in the process more particularly described in my application Serial No. 557,570, filed August 17, 1931, of producing fuel briquettes, in which the accurate proportioning of the binder to the amount of pulverized material is of great importance and where an accuracy of control of variations of the order of .0005 is desirable. It is to accomplish this type of sensitively accurate control, especially in connection with the flow of viscous liquids, that the method of this invention was devised and the apparatus to carry out such a method was invented. The nature and utility of the invention will be sufficiently understood from the following description of the apparatus as designed and used for the just-stated purpose, although evidently it may be used for the supply of other materials of similar character, or where operating conditions are analogous.

A principal feature of the invention is the provision, in association with means for moving the material, such as a pump, of a flow measuring instrumentality, such as a meter, and a valve under the control of such instrumentality, to vary or readjust the amount of flow to such meter in response to variations in the amount passing through the meter at each moment; and an additional important feature is the provision of valve controlling means in the nature of automatic light ray control apparatus including photo-electric cells, or the equivalent, and cooperating devices or arrangements actuated by variations in the output of an electric generator (such as a tachometer-generator) impelled by the flow meter, and operative to control a motor which regulates the valve, so that the valve position is readjusted promptly upon and in accordance with variations in the amount of material passing through the meter. The control is so accurate that proper correction is automatically made for variations at the meter of such a small proportion of the total flow as .0005.

In a preferred arrangement, the flow controlling valve is located in a by-pass conduit or circuit so that the control of flow to the meter is indirect; in other words, the desired correction of flow rate is obtained by varying the proportion of the total flow which is caused to move through the by-pass conduit or circuit.

The characteristics and advantages of the invention are further sufficiently explained in connection with the following detail description of the accompanying drawing, which shows a representative embodiment. After considering this example, skilled persons will understand that many variations may be made without departing from the principles disclosed, and I contemplate the employment of any structures that are properly within the scope of the appended claims.

In said drawing,

Fig. 1 is an elevation in diagrammatic form of an apparatus embodying the invention.

Fig. 2 is a detail in side elevation, from the right, of the flow control gate or valve with its motor and gearing.

Fig. 3 is a section at 3—3, Fig. 1.

The material, such as a binder of the character above referred to, usually in a heated and viscous condition, is brought to the apparatus through a supply pipe 1, which may be steam jacketed if desired, and all other parts of the apparatus, including the pump presently referred to, through which the binder flows, may also be jacketed, wherever necessary, to maintain the material in proper condition.

The pipe system through which the material flows includes a pipe 2 in which a pump, such as a booster pump 3, is located, and leading to a three-way valve 4. In ordinary operation the material propelled by the pump passes through the valve or T fitting 5 in which the valve is located, to a branch point or T 6 which is connected at the left, as viewed in Fig. 1, to a suitable flow measuring device, such as a flow meter 7; and from the meter the material is discharged through a pipe 8 to any desired point of utilization, or in the case of a binder for briquetting, to the mixer, where the binder is combined with the pulverized fuel. From the branch or T 6 there is at the right (in Fig. 1) a connection to a flow controlling gate or valve 9, and from this valve pipes 10 and 11 lead to a point in the supply line anterior to the pump 3, or as shown, to a T 12 in the supply line. There is thus formed a main by-pass circuit through which a substantial proportion of the total material may be made to pass back to the intake side of the pump while the remainder of the material passes to and through the meter 7. Preferably, there is also a secondary by-pass circuit provided by a pipe or connection 13 from the three-way valve 4 to pipe 11, so that by adjusting the position of the valve 4, any or all of the material may be cut off from the meter and caused to flow back through pipes 13 and 11 to the supply side of the pump, as indicated by the broken line arrows. Normally the flow is as indicated by the solid line arrows, that is, from the supply pipe to the pump, to valve 4, to T 6 with only enough from 4 to 11 to keep the material from setting in 13; from this branch point a desired average proportion of the total goes to the meter and thence to the mixer, as described more fully hereinbelow, and the remainder passes through the control valve 9 and so back to the intake side of the pump. The capacity of the pump 3 is preferably sufficient to deliver a substantial excess, say from approximately 25% to 50% more material than is required for supply to the mixer.

The flow meter 7 is connected, as by gears 14, to a suitable electric generator, such as a tachometer generator 15 and the output of this generator is carried by cables 16 to an electrically operated controlling apparatus designated as a whole as 17.

The main flow controlling valve 9 is operated by a motor 18 supported on a frame 19 and connected by suitable reduction gearing, such as the worm gearing 20, to the valve stem or shaft 21, and the motor is driven in either direction by current supplied as through cable 22 from the apparatus 17. The magnitude and direction of the current supplied to the valve motor 18 is thus the controlled output of the controlling apparatus 17, which, in the form of the invention illustrated, operates photo-electrically and is in turn controlled by variations in the amount of flow through the meter 7, these variations being converted into variations in the current output of the tachometer generator 15 whose output, as stated, is conveyed to the controlling apparatus 17; and motor 18 promptly opens or closes the main controlling valve 9 to a corresponding degree and accurately corrects the flow rate to the required extent by varying the amount of the total flow which passes through the main by-pass circuit 10—11 to the pump intake.

The controlling apparatus 17 may be of a known or any suitable type. As shown, it comprises as principal essentials an electric meter or indicator 23 having a pointer 24 which gives an indication corresponding to the flow through the meter in pounds per minute. This indicator is energized by the output current of the generator 15, which usually passes through a variable resistance such as 25. The pointer or equivalent moving member 24 of instrument 23 may be arranged as a shutter 26 (see Fig. 3) to control light beams from two lamps 27. These light beams pass through apertures 28 in a casing 29 and fall upon photo-electric cells 30 which have suitable output connections to amplifiers 31; and these amplifiers have suitable connections to a switch in a switch box 32, and this switch controls the direction and speed of operation of the valve motor 18. The photo-electric apparatus may include a handle 33 and suitable connections or means for adjusting the apparatus in accordance with "demand" variations. Further description of the electric control apparatus 17 is unnecessary as it may be of a known type, and details of this apparatus per se are not a part of the invention, except as certain essential parts are referred to in certain of the claims in combination with features of the flow producing and controlling apparatus proper.

If necessary or desirable the present flow apparatus may be arranged to operate a recording instrument (not shown).

The operation of the apparatus will be clear from the above description. The booster pump 3 normally feeds a greater amount of material than is desired to pass to the mixer through the meter 7, the excess flowing through the valve 9 back to the suction side of the pump. The valve is held open to the proper extent by the passage of current of a definite strength from the generator 15 to the controlling apparatus 17. Upon variation in the amount of material passing through the meter, the current generated by the generator 15 will vary correspondingly in magnitude and the valve 9 will be suitably adjusted by its motor 18 to compel the predetermined amount of material to flow through the meter 7.

By rotating the handle 33, a counter-torque or resistance acting on the pointer 24 may be adjusted so as to vary the strength of the generator current required to bring such pointer to the normal, central position shown in Fig. 1, and in this way the predetermined rate of material flow through the meter may be regulated at will.

The apparatus is designed to carry out the novel method whereby a liquid circuit representing a continuous over-supply with reference to the amount to be withdrawn for use is established and a predetermined rate of flow of the liquid to the point of use is made the controlling agent for an accurately responsive device controlling a by-pass liquid circuit to permit increase of flow therethrough or to restrict the flow therethrough, whereby the flow of liquid through the line leading to the point of use is automatically maintained by its own responsiveness to whatever may be its predetermined rate or variations of rate of flow. This rate of flow may be uniform or it may vary according to a predetermined schedule or it may be made to vary automatically with reference to the amount of another material such as coal which may be supplied to the mixer at a controlled rate. The important factor in each instance is the determination of what flow is desired and then adjusting the flow controlling parts of the apparatus to be responsive to the predetermined conditions. Thus the predetermined rate or variations of rate of flow may be constant or determined by varying conditions of coal flow to the mixer automatically reflective on the flow meter for the liquid. In every case, however, the amount of liquid delivered through the flow meter to the mixer will always be exactly (within very narrow limits of the order of .0005) the flow called for by the requirements of the mixing procedure at the mixer as determined by the briquetting process, the predetermined ratio of ingredients, predetermined speed, variations in speed to attain the predetermined ratio of ingredients, or the rate of feed of the mixed products to the briquetting press.

I claim:

1. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, and photo-electric means automatically operating the valve under control of the meter to vary the amount of material by-passed and thus to vary the proportion flowing to the meter.

2. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor for moving the valve, and photo-electric means automatically operating the motor under control of the meter to vary the amount of material by-passed through said valve and thus to vary the proportion flowing to the meter.

3. Apparatus as set forth in claim 2 including adjustable means for setting said photo-electric apparatus to a selectively predetermined rate of feed through the meter.

4. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor operating the flow control valve, an electric generator driven by the meter, and means controlled by output of the generator and in turn controlling the actuation of the valve motor to re-position the flow valve in accordance with variations in flow through the meter.

5. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor operating the flow control valve, an electric generator driven by the meter, and photo-electric apparatus controlled by output of the generator and in turn controlling the actuation of the valve motor to re-position the flow valve in accordance with variations in flow through the meter.

6. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, and means automatically operating the valve under control of the meter to vary the amount of material by-passed and thus to vary the proportion flowing to the meter, a secondary by-pass conduit and a valve controlling the flow of material from the pump through the secondary by-pass or to the flow meter and main by-pass conduit.

7. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor operating the flow control valve, an electric generator driven by the meter, and means controlled by the output of the generator and in turn controlling the actuation of the valve motor to re-position the flow valve in accordance with variations in flow through the meter, a secondary by-pass conduit, and a valve controlling the flow of material from the pump through the secondary by-pass or to the flow meter and main by-pass conduit.

8. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor operating the flow control valve, an electric generator driven by the meter, and photo-electric apparatus controlled by the output of the generator and in turn controlling the actuation of the valve motor to re-position the flow valve in accordance with variations in flow through the meter, said photo-electric apparatus including a measuring instrument energized by the output of said generator, photo-electric cells, light sources, amplifiers connected with the cells, and a motor controller itself operated by the amplifiers and in turn controlling the operation of the valve motor.

9. Flow producing and controlling apparatus comprising a main flow conduit, a pump therein, a flow meter, and a by-pass conduit leading to the intake side of the pump, the main conduit being arranged to supply material from the pump to the meter and the by-pass conduit, a valve controlling the return flow through the by-pass conduit, a motor operating the flow control valve, an electric generator driven by the meter, photo-electric apparatus controlled by the output of the generator and in turn controlling the actuation of the valve motor to re-position the flow valve in accordance with variations in flow through the meter, said photo-electric apparatus including a measuring instrument energized by the output of said generator, photo-electric cells, light sources, amplifiers connected with the cells, and a motor controller itself operated by the amplifiers and in turn controlling the operation of the valve motor, a secondary by-pass conduit, and a valve controlling the flow of material from the pump through the secondary by-pass or to the flow meter and main by-pass conduit.

ELLSWORTH B. A. ZWOYER.